(12) United States Patent
Liao

(10) Patent No.: US 12,184,188 B2
(45) Date of Patent: Dec. 31, 2024

(54) DETERMINING SYNCHRONOUS RECTIFICATION ON-TIME OF CLLC CONVERTER

(71) Applicant: Siemens Aktiengesellschaft, Munich (DE)

(72) Inventor: Hua Liao, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 18/570,265

(22) PCT Filed: Jun. 17, 2021

(86) PCT No.: PCT/CN2021/100691
§ 371 (c)(1),
(2) Date: Dec. 14, 2023

(87) PCT Pub. No.: WO2022/261902
PCT Pub. Date: Dec. 22, 2022

(65) Prior Publication Data
US 2024/0275295 A1    Aug. 15, 2024

(51) Int. Cl.
*H02M 3/335* (2006.01)
*H02M 1/00* (2006.01)
*H02M 3/00* (2006.01)

(52) U.S. Cl.
CPC ..... *H02M 3/33592* (2013.01); *H02M 1/0009* (2021.05); *H02M 3/01* (2021.05); *H02M 3/33584* (2013.01)

(58) Field of Classification Search
CPC .. H02M 3/33592; H02M 1/0009; H02M 3/01; H02M 3/33584
See application file for complete search history.

(56) References Cited

U.S. PATENT DOCUMENTS

| 7,209,369 B1 * | 4/2007 | Yasumura | H02M 1/34 363/19 |
| 2011/0211370 A1 | 9/2011 | Luo | 363/21.02 |

FOREIGN PATENT DOCUMENTS

| CN | 105 871 215 | 8/2016 | ............ H02M 3/335 |
| CN | 110 022 066 | 7/2019 | ............ H02N 3/335 |

(Continued)

OTHER PUBLICATIONS

Search Report for International Application No. PCT/CN2021/100691, 10 pages.

*Primary Examiner* — Kyle J Moody
(74) *Attorney, Agent, or Firm* — Slayden Grubert Beard PLLC

(57) ABSTRACT

An example method may include: determining a transformer turns ratio and resonant frequency of a converter; determining datasets of peak current and output current of a secondary side diode, an excitation current of a primary excitation inductor when the secondary side diode is off, and an excitation current of the primary excitation inductor when a primary side driving signal is off; measuring a operating frequency and output current of the converter; determining coefficients equal to a ratio of the output current to the peak current multiplied by $$\frac{\pi}{2},$$

and a ratio of an excitation current of the primary excitation inductor when the secondary side diode is off to an excitation current of the primary excitation inductor when the primary side driving signal is off; measuring a resonant (Continued)

current initial value of a primary resonant inductor; and based on all these, calculating a diode on-time.

4 Claims, 11 Drawing Sheets

(56) References Cited

FOREIGN PATENT DOCUMENTS

| | | | |
|---|---|---|---|
| CN | 110 838 793 | 2/2020 | ............ H04L 29/08 |
| CN | 112 542 952 | 3/2021 | ............ H02M 3/335 |

* cited by examiner

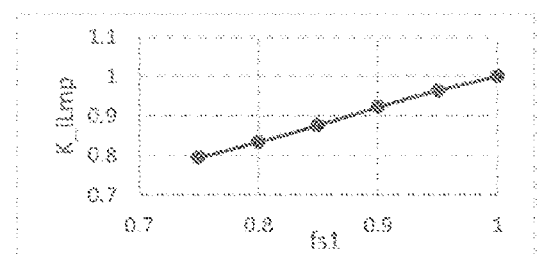
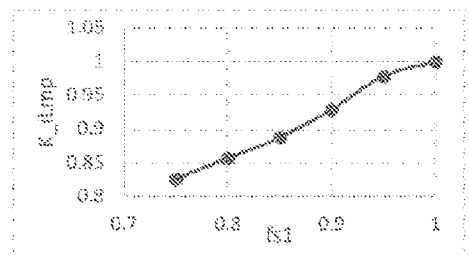
Fig.8A                Fig.8B
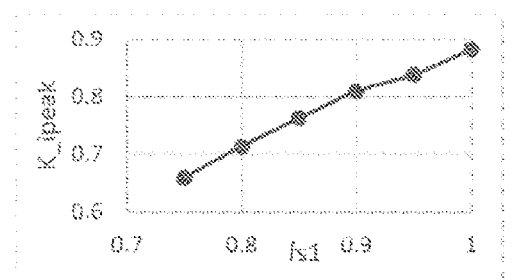
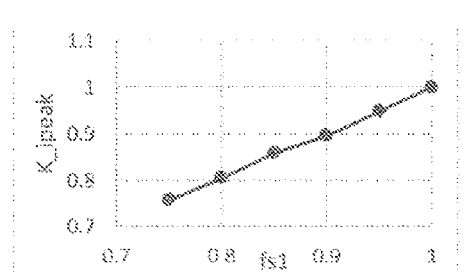
Fig.8C                Fig.8D

DETERMINING SYNCHRONOUS RECTIFICATION ON-TIME OF CLLC CONVERTER

CROSS-REFERENCE TO RELATED APPLICATIONS

This application is a U.S. National Stage Application of International Application No. PCT/CN2021/100691 filed Jun. 17, 2021, which designates the United States of America, the contents of which are hereby incorporated by reference in their entirety.

TECHNICAL FIELD

The present disclosure generally relates to the technical field of circuits. More specifically, the teachings of the present disclosure include systems and/or methods for determining a synchronous rectification on-time of a CLLC converter.

BACKGROUND

A bidirectional DC/DC (direct current/direct current) converter is used in many applications, such as energy storage, V2G, etc. In different DC/DC topologies, LLC converters have acquired extensive use due to soft switching and efficient performance thereof. FIG. 1 is a typical bidirectional LLC (CLLC) converter topology circuit; said circuit may operate in two directions: forward and reverse.

To improve circuit efficiency, normally synchronous rectification (SR) is used to reduce power loss of a body diode of a power switch located on an inactive side.

"Body diode" refers to a parasitic diode of the interior of a power switch; the CLLC converter topology circuit 100 in FIG. 1 comprises a first power switch to a fourth power switch of a primary side, and a fifth power switch to an eighth power switch of a secondary side. Each power switch may be seen as comprising a MOSFET (Q1-Q8), and a diode (D1-D8) connected in parallel in reverse. Below, "body diode" is abbreviated to "diode".

The CLLC converter topology circuit 100 in FIG. 1 further comprises an input capacitor $C_{in}$, a resonant capacitor $C_{r1}$ and resonant inductor $L_{r1}$ and an excitation inductor $L_m$ of a primary side, a transformer $T_1$, and a resonant inductor $L_{r2}$, a resonant capacitor $C_{r2}$ and an output capacitor $C_{out}$ of a secondary side.

Regarding a unidirectional LLC converter, by means of detecting a change of voltage or current when a diode initially turns on, a special synchronous rectification integrated circuit may be used to automatically generate a driving pulse for a MOSFET. However, regarding a CLLC situation, due to a conflict with a MOSFET gate drive, a synchronous rectification integrated circuit cannot be directly used. Therefore, another method must be used for bidirectional CLLC converters.

A common method at present is shown in a simplified circuit structural drawing 200 of FIG. 2, comprising a MOSFET current sensor 201, a zero-crossing comparator 202, a DSP timing register 203 and a gate driver 204. In said circuit, the current sensor 201 and the zero-crossing comparator circuit 202 are added. The current sensor 201 samples a current 205 passing through a diode and generates a synchronous rectification trigger signal by means of the zero-crossing comparator circuit 202. Next, the DSP timing register 203 is configured to generate a synchronous rectification pulse 206 according to the trigger signal. This type of solution requires a high-speed current sensor and an additional zero-crossing comparator circuit, and in this way increases system costs.

Another method is using a lookup table in an MCU, and FIG. 3 shows a structural drawing of a simplified circuit 300 of this type of solution. Firstly, under different operating frequency and load conditions, a diode on-time is measured, and a diode on-time lookup table is created. Under actual operating conditions, the MCU samples a required parameter, such as operating frequency $f_s$, output current Is, input voltage Vin and output voltage Vout, etc., and finds nearby operating points in the lookup table 301, and uses an interpolation method to obtain a required on-time. According to the obtained on-time, a timing register 302 of a controller, such as a DSP, is configured to generate a synchronous rectification pulse 303 according to a trigger signal, and thereby generates a gate drive signal. This type of method does not require a current sensor and a zero-crossing detection circuit, but requires performing measurements under different operating conditions in advance to obtain a lookup table, and the process of obtaining the table by measurement is somewhat laborious.

SUMMARY

A brief summary of the present disclosure is presented below, so as to provide a basic understanding of certain aspects of the teachings herein. It should be understood that this summary is not an exhaustive overview. It is not intended to determine key or critical elements of the teachings of the present disclosure, nor to define the scope thereof. The purpose of the summary is merely to present certain concepts in a simplified form, as a prelude to a more detailed description that will be discussed later. In view of this, some embodiments include a method for determining a synchronous rectification on-time of a CLLC converter, which does not require adding additional hardware, and is simple and easy.

As an example, a method for determining a synchronous rectification on-time of a CLLC converter operating in an under-resonant operation mode, may comprise:
  step I: determining a transformer turns ratio and resonant frequency of a converter;
  step II: using a simulation method, determining datasets of a peak current and output current of a secondary side diode, as well as an excitation current of a primary excitation inductor when the secondary side diode is off, and an excitation current of the primary excitation inductor when a primary side driving signal is off;
  step III: measuring a current operating frequency and current output current of the converter;
  step IV: according to said operating frequency and said output current, determining a first coefficient and a second coefficient by means of a linear interpolation method, wherein the first coefficient is equal to a ratio of the output current to the peak current then multiplied by $$\frac{\pi}{2},$$

and the second coefficient is equal to a ratio of an excitation current of the primary excitation inductor when the secondary side diode is off to an excitation current of the primary excitation inductor when the primary side driving signal is off;

step V: measuring a resonant current initial value of the primary resonant inductor; and step VI: according to the transformer turns ratio, the resonant frequency, the resonant current initial value, the current output current, the first coefficient and the second coefficient, calculating a diode on-time.

In some embodiments, the method further comprises step VII: the method for determining a synchronous rectification on-time of a CLLC converter further comprising using the determined diode on-time to configure a timing register in a controller of the converter.

In some embodiments, in each switching cycle of the CLLC converter, said step III to said step VII are re-executed to determine a diode on-time of the current switching cycle.

In some embodiments, the diode on-time is:

$$\frac{1}{2*\text{resonant frequency}} \cdot \sqrt{\frac{1}{1 + \frac{\text{turns ratio}}{\pi} \cdot \frac{\text{resonant current initial value}}{\text{output current}}}}$$

In some embodiments, for a CLLC operation in an under-resonant mode, a method for determining a synchronous rectification on-time is provided. The present method, by means of measuring a resonant current and output current value, may approximately calculate a synchronous rectification on-time.

The methods described herein do not require a high-bandwidth current sensor and zero-crossing detection circuit, and in this way saves on hardware costs and PCB space and do not need to measure diode on-time at different frequencies and loads in advance, and therefore saves on a large amount of work.

BRIEF DESCRIPTION OF THE DRAWINGS

The above and other objects, features, and advantages of the teachings of the present disclosure will be more easily understood with reference to the following description of example embodiments in conjunction with the drawings. The components in the drawings are merely illustrative of the principles of the present disclosure. In the drawings, the same or similar technical features or components are denoted using the same or similar reference signs. In the drawings:

FIGS. 8A-8D are simulation curves of a first coefficient $k_{ipeak}$ and a second coefficient $k_{iLmp}$ respectively in situations of a minimum load and a maximum load, at different operating frequencies;

KEY TO FIGURES

Figure 1:
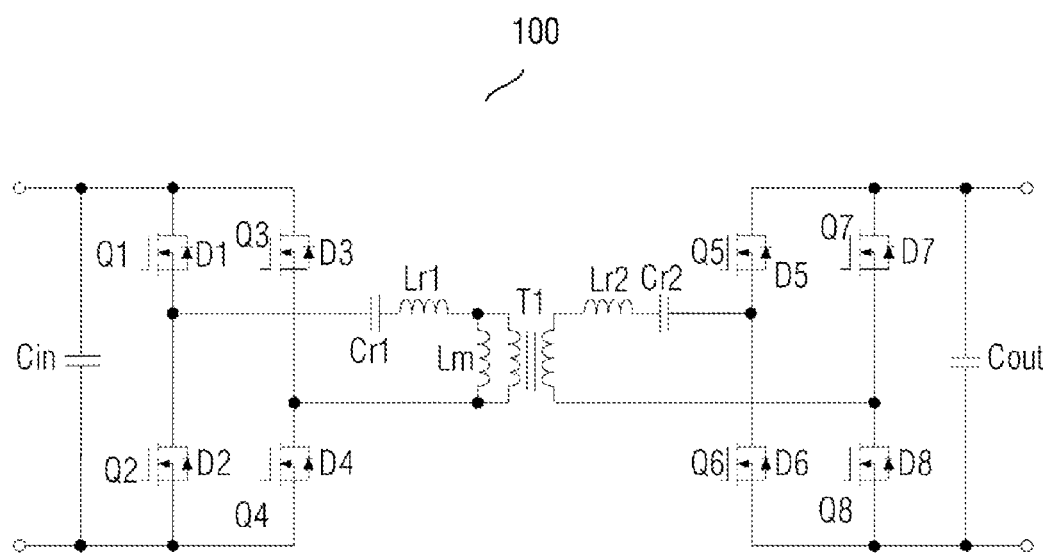
FIG. 1 is a topology circuit drawing of a CLLC converter.
Figure 2:
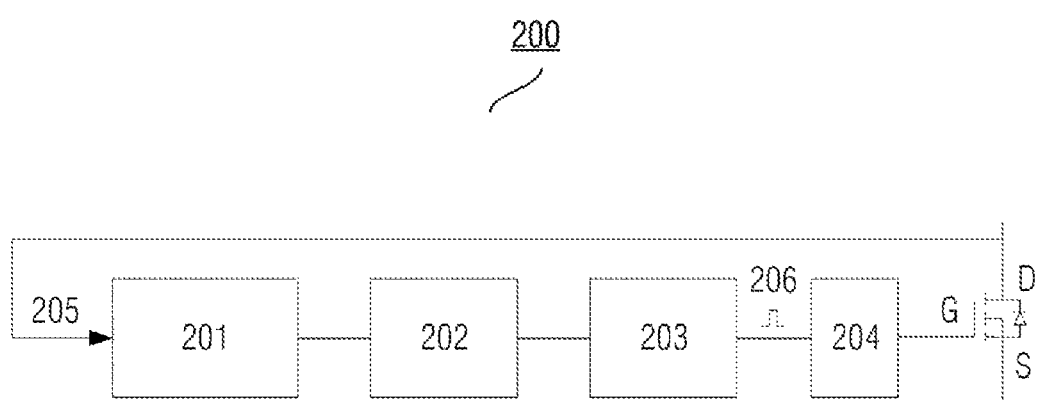
FIG. 2 is a simplified circuit structure drawing which can realize synchronous rectification of a CLLC converter in the prior art.
Figure 3:
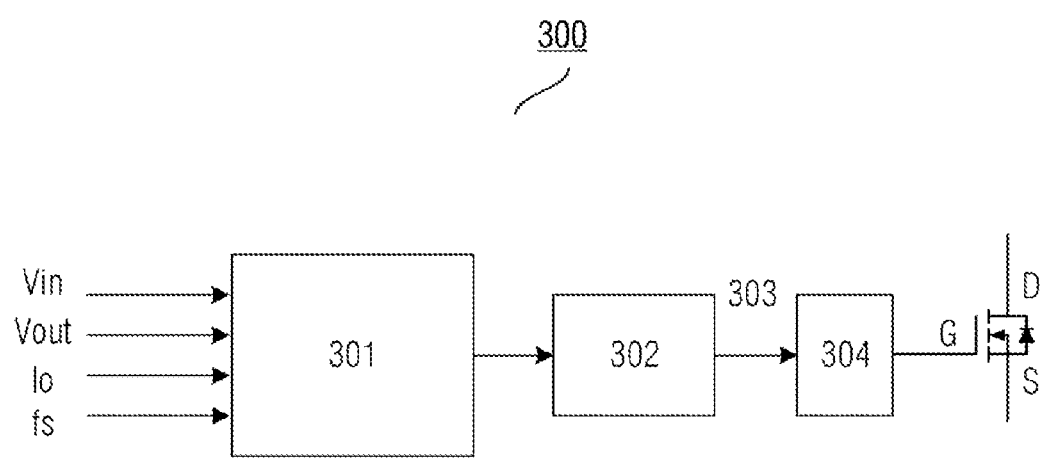
FIG. 3 is a simplified circuit structure drawing of synchronous rectification of a CLLC converter realized using a lookup table.

100: CLLC converter topology circuit
Q1-Q8: MOSFET
D1-D8: diode
$C_{in}$: input capacitor
$C_{r1}$: resonant capacitor
$L_{r1}$: resonant inductor
$L_m$: excitation inductor
$T_1$: transformer
$L_{r2}$: resonant inductor
$C_{r2}$: resonant capacitor
$C_{out}$: output capacitor
200: synchronous rectification circuit structure drawing
201: MOSFET current sensor
202: zero-crossing comparator
203: DSP timing register
204: gate driver
205: current
206: synchronous rectification pulse
300: synchronous rectification circuit structure drawing
301: lookup table
302: timing register
303: synchronous rectification pulse
$V_{ab}$: input voltage
$V_1$: primary voltage
$V_2$: secondary voltage
N: transformer turns ratio
G1, G2: driving waveform
$i_{Lr1}$: resonant current
$i_{Lm}$: excitation current
$i_{D5}$: current of diode D5
$i_{D7}$: current of diode D7
$I_{peak}$: secondary side diode peak current
$i_{Lm0}$: initial value of excitation current
$\Delta_{ILm}$: amount of change of excitation current
$I_{Lmp}$: excitation current when diode is off
$\Phi$: diode conduction angle
$k_{ipeak}$: first coefficient
$k_{iLmp}$: second coefficient
fs1: normalized operating frequency
$\Delta I_{Lmp}$: amount of change of excitation current
1000: method for determining synchronous rectification on-time
S1001, S1002, S1003, S1004, S1005, S1006, S1007: step
T (ns): time (nanoseconds)
Po (W): output power (watts)
$I_{Lmpp}$: excitation current when primary side driving signal is off

DETAILED DESCRIPTION

The subject matter described herein is now discussed with reference to exemplary embodiments. It should be understood that these embodiments are discussed purely in order to enable those skilled in the art to better understand and thus implement the subject matter described herein, without limiting the protection scope, applicability, or examples expounded in the claims. The functions and arrangement of the elements discussed may be changed without departing from the protection scope of the content of the present disclosure. Various processes or components can be omitted from, replaced in or added to each example as required. For example, the method described may be executed in a different order from that described, and various steps may be added, omitted, or combined. In addition, features described in relation to some examples may also be combined in other examples.

As used herein, the term "comprises" and variants thereof denote open terms, meaning "including but not limited to". The term "based on" means "at least partly based on". The terms "one embodiment" and "an embodiment" mean "at least one embodiment". The term "another embodiment" means "at least one other embodiment". The terms "first", "second", etc. may denote different or identical objects. Other definitions may be included below, either explicit or implicit. Unless clearly indicated in the context, the definition of a term is the same throughout the description.

Figure 4A:
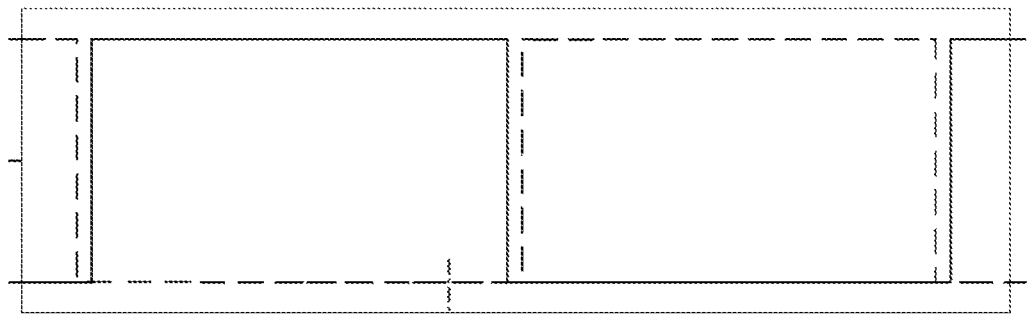
FIGS. 4A-4C are operating waveform graphs of a CLLC converter operating in an under-resonant mode.
Figure 4B:
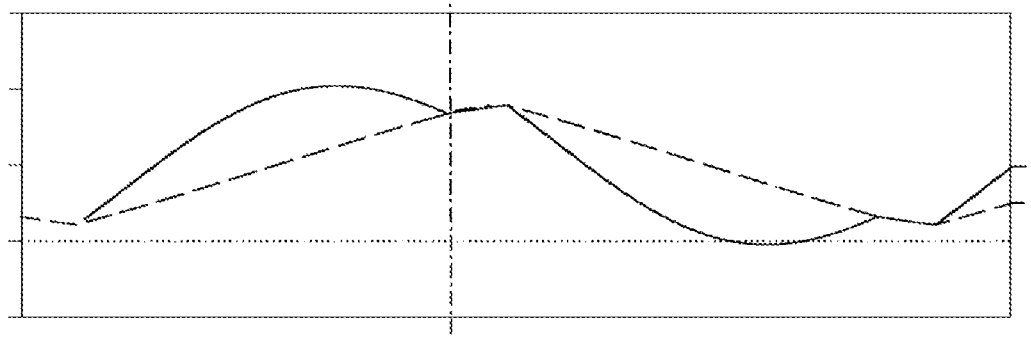
Figure 4C:
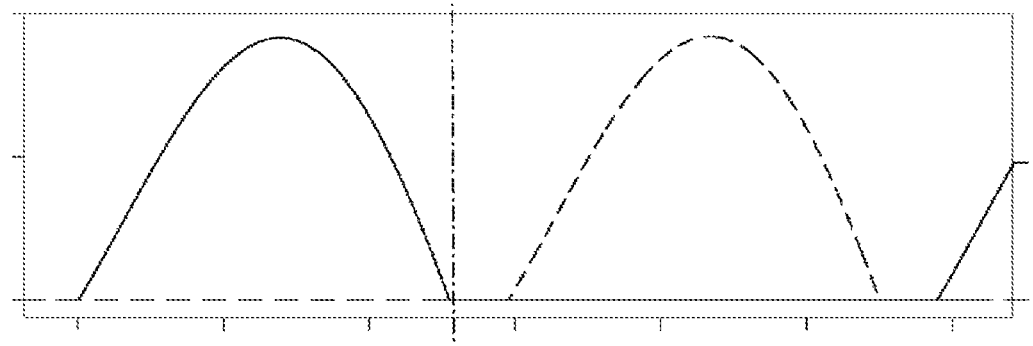

In some embodiments, there is a method for determining a synchronous rectification on-time of a bidirectional CLLC converter in an under-resonant operation mode. FIGS. 4A-4C are operating waveforms of the bidirectional CLLC converter of FIG. 1 operating in an under-resonant mode, wherein an operating frequency fs thereof<a resonant frequency fr.

In FIG. 4A, the solid line represents a driving waveform of a MOSFET Q1, the dotted line represents a driving waveform of a MOSFET Q2, and it can be understood that the driving waveforms of Q1 and Q4 are the same, and the driving waveforms of Q2 and Q3 are the same.

In FIG. 4B, the solid line represents a current waveform of a resonant inductor $L_{r1}$ of a primary side, and the dotted line represents a current waveform of an excitation inductor $L_m$.

In FIG. 4C, the solid line represents a current waveform of a secondary side diode D5, and the dotted line represents a current waveform of a secondary side diode D7.

When the circuit operates in a forward direction, the currents of diode D5 and diode D8 are the same, the currents of diode D7 and diode D6 are the same, D5 and D7 operate alternately, and each is on for half a cycle. That is, the current waveforms of D5-D8 are all the same; therefore, in the derivation below, the on-times thereof are calculated by taking D5 as an example. For operation in the forward direction, the on-times of diodes D5-D8 of the secondary side are calculated; for operation in the reverse direction, the on-times of D1-D4 of the primary side are calculated.

Figure 5A:
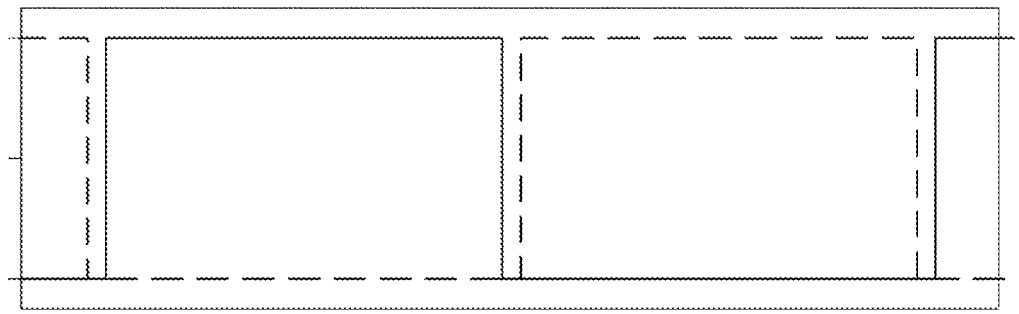
FIGS. 5A-5C are operating waveform graphs of a CLLC converter operating in an over-resonant mode.
Figure 5B:
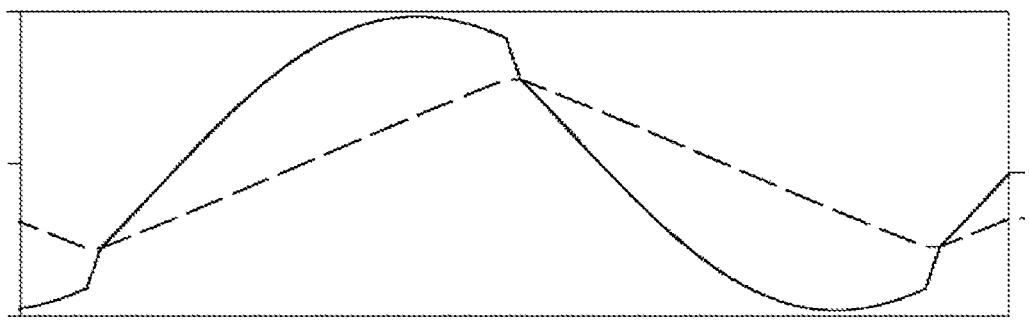
Figure 5C:
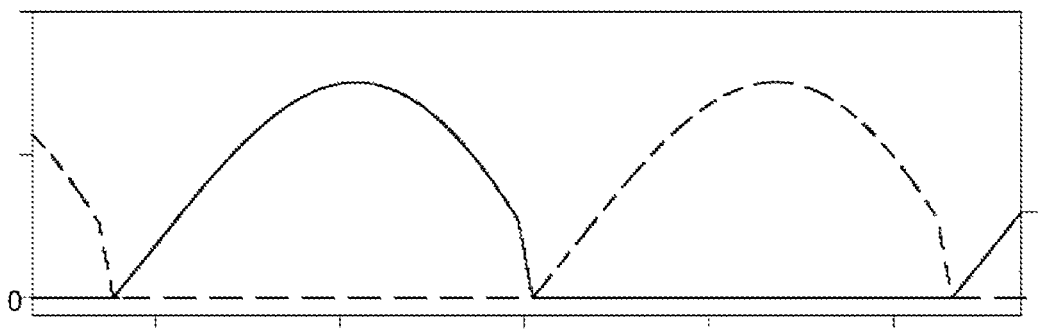

FIGS. 5A-5C are operating waveforms of a bidirectional CLLC converter operating in an over-resonant mode, wherein an operating frequency fs>a resonant frequency fr. The curves in FIGS. 5A—5C and the curves in FIGS. 4A-4C respectively represent the same content, which is not again recounted here.

In the present description, an explanation is provided by taking a bidirectional LLC circuit operating in a forward direction as an example, that is, the left side is the input and the right side is the output. When a bidirectional LLC circuit operates, in principle, it is only necessary to provide one driving pulse G1-G4 respectively to a first MOSFET to fourth MOSFET Q1-Q4 of a first power switch to fourth power switch of a primary side, and it is not necessary for a fifth MOSFET to eighth MOSFET Q5-Q8 of a fifth power switch to eighth power switch of a secondary side to be provided with a pulse to operate; it is sufficient only to let a fifth diode to eighth diode D5-D8 operate. However, in actuality, because conduction losses of conduction of D5-D8 are large, generally when D5-D8 of the fifth MOSFET to eighth MOSFET are on, driving pulses are synchronously provided to the corresponding fifth MOSFET to eighth MOSFET Q5-Q8, letting Q5-Q8 and D5-D8 synchronously conduct, reducing losses, and this type of method is the synchronous rectification (SR) referred to. In order to maintain synchronous conduction of Q5-Q8 and D5-D8, the present invention provides a method for how to determine an on-time of D5-D8 during synchronous rectification.

The synchronous rectification on-time is determined by a driving signal of the primary side, but an off-time should be determined by an on-time of a diode. It can be seen from FIGS. 5A-5C that, when an operating frequency of the CLLC converter is higher than a normal resonant frequency fr, when the CLLC converter circuit operates in an over-resonant mode, an on-time of a fifth diode D5 of the secondary side and a driving pulse G1 of a first transistor Q1 of the primary side are basically synchronized, and, in this type of situation, the driving pulse G1 of the primary side may be directly provided to a fifth transistor Q5 of the secondary side. However, in an under-resonant operation mode shown in FIGS. 4A-4C, a current of the fifth diode D5 of the secondary side has already reduced to 0 before the driving pulse G1 of the primary side is off; therefore, the present invention mainly concerns how to determine an off-time of a diode, in an under-resonant operation mode, so that an on-time of the diode may be determined.

Figure 6:
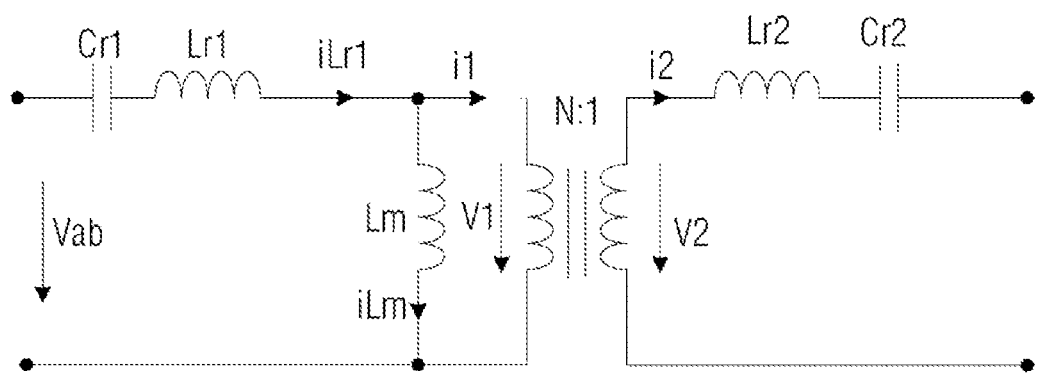
FIG. 6 is a resonant cavity equivalent circuit drawing of a CLLC converter.

FIG. 6 is a resonant cavity equivalent circuit of the bidirectional CLLC converter shown in FIG. 1, wherein $L_{r1}$ and $C_{r1}$, and $L_{r2}$ and $C_{r2}$ are respectively resonant inductors and capacitors of a primary side and a secondary side, $L_m$ is a transformer excitation inductor, N is a transformer turns ratio, $V_{ab}$ is an input voltage of the circuit, V1 and V2 are respectively voltages of the transformer primary side and secondary side, $i_{Lr1}$ is a resonant current, and $i_{Lm}$ is an excitation current.

Hence the resonant cavity input voltage may be expressed as:

$$V_{ab} = NV_2 + \omega_s L_{r1} \frac{di_{Lr1}}{d\theta} + \frac{1}{\omega_s C_{r1}} \int i_{Lr1} d\theta$$

wherein $\omega_s$ is a current operating angular frequency (units of rad/s) of the CLLC circuit, $\omega_r$ is a resonant angular frequency (units of rad/s) of the CLLC circuit, and $\theta$ is a variable representing a diode current waveform.

FIGS. 7A-7D are detailed operating waveform graphs of a CLLC converter operating in an under-resonant mode.

Figure 7A:
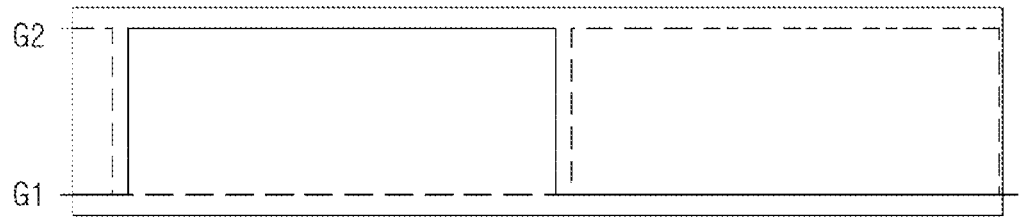
FIGS. 7A-7D are detailed operating waveform graphs of a CLLC converter operating in an under-resonant mode.
Figure 7B:
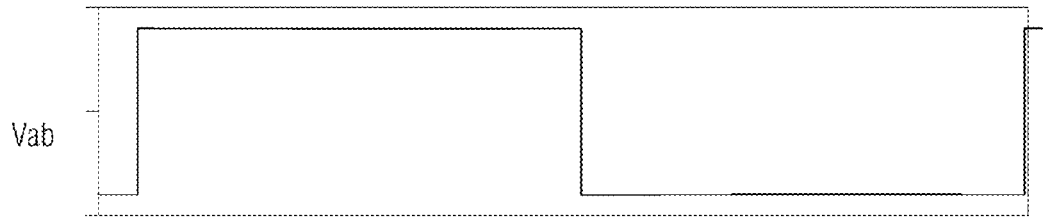
Figure 7C:
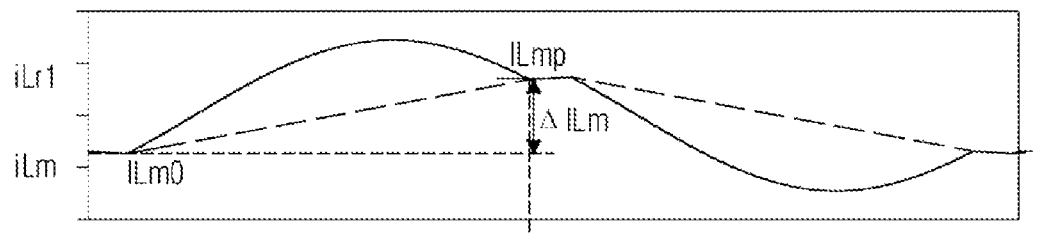
Figure 7D:
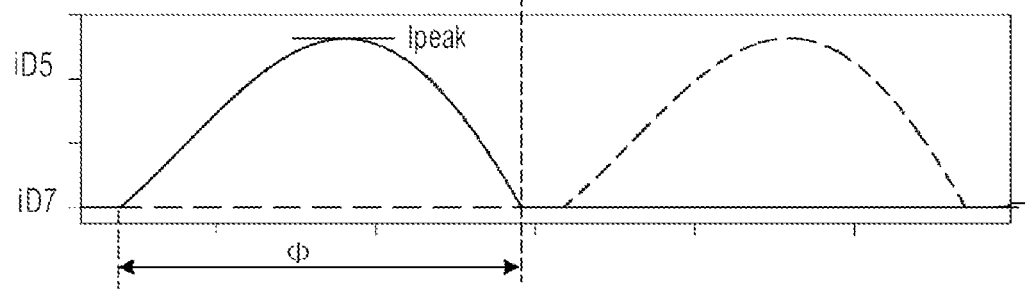

In FIG. 7A, the solid line represents a driving waveform G1 of a MOSFET Q1, and the dotted line represents a driving waveform G2 of a MOSFET Q2. FIG. 7B shows a waveform of an input voltage $V_{ab}$. In FIG. 7C, the solid line represents a waveform of a resonant current $i_{Lr1}$ of a resonant inductor $L_{r1}$ of a primary side, and the dotted line represents a waveform of an excitation current $i_{Lm}$ of an excitation inductor $L_m$. In FIG. 7D, the solid line represents a current $i_{D5}$ of a secondary side diode D5, the dotted line represents a current $i_{D7}$ of a secondary side diode D7, and $I_{peak}$ is a peak current of $i_{D5}$.

The current $i_{D5}$ of diode D5 in an on period may be expressed as:

$$i_{DS} = I_{peak}\sin\left(\frac{\pi\theta}{\Phi}\right), 0 < \theta < \phi$$

wherein $I_{peak}$ is a peak current of diode $i_{DS}$, and o is a diode conduction angle. An excitation current $i_{Lm}$ of an excitation inductor $L_m$ of a transformer may be expressed as:

$$iL_m = I_{Lm0} + \Delta I_{Lm} \cdot \frac{\theta}{\Phi}$$

wherein $i_{Lm}$ represents an excitation current, $i_{Lm0}$ represents as initial value of the excitation current, and $\Delta I_{Lm}$ is an amount of change of excitation current at the end of the angle $\Phi$.

The following formula may be obtained from the above to express $V_{ab}$:

$$V_{ab} = \left(1 + \frac{L_{r1}}{L_m}\right)NV_2 + \left(\omega_s L_{r1} \cdot \frac{\pi}{\Phi} - \frac{1}{\omega_s C_{r1}} \cdot \frac{\Phi}{\pi}\right) \cdot \left(\frac{I_{peak}}{N}\right) \cdot \cos\left(\frac{\pi\theta}{\Phi}\right) +$$
$$\frac{1}{\omega_s C_{r1}} \cdot \left(I_{Lm0} \cdot \theta + \frac{\Delta I_{Lm} \cdot \theta^2}{2\Phi}\right) + V_{Cr0}$$

$V_{ab}$ and $V_2$ are considered constants in an on-time period, and by finding the derivative of the above equality, it is possible to obtain:

$$\left[1 - \left(\frac{\omega_s}{\omega_r}\right)^2 \cdot \left(\frac{\pi}{\Phi}\right)^2\right]\sin\left(\frac{\pi\theta}{\Phi}\right) + \frac{N}{I_{peak}}\left(I_{Lm0} + \Delta I_{Lm} \cdot \frac{\theta}{\Phi}\right) = 0$$

From the above formula, a conduction angle duty cycle may be expressed as:

$$\frac{\Phi}{\pi} = \frac{\omega_s}{\omega_r} \cdot \sqrt{\frac{\sin\left(\frac{\pi\theta}{\Phi}\right)}{\sin\left(\frac{\pi\theta}{\Phi}\right) + \frac{N}{I_{peak}}\left(I_{Lm0} + \Delta I_{Lm} \cdot \frac{\theta}{\Phi}\right)}}$$

Now, selecting a time at $\theta=\Phi/2$, a simplified form of the conduction angle duty cycle may be obtained:

$$\frac{\Phi}{\pi} = \frac{\omega_s}{\omega_r} \cdot \sqrt{\frac{1}{1 + \frac{N}{I_{peak}}\left(I_{Lm0} + \frac{\Delta I_{Lm}}{2}\right)}}$$

Because $I_{peak}$ and $\Delta I_{Lm}$ cannot be directly derived, two coefficients $k_{ipeak}$ and $k_{iLmp}$ are introduced.

$$I_{peak} = \frac{\frac{\pi}{2}I_o}{k_{i_{peak}}}, 0 < k_{i_{peak}} < 1$$

$$I_{Lmp} = I_{Lmpp} \cdot k_{i_{Lmp}}, 0 < k_{i_{Lmp}} < 1$$

wherein $I_o$ is an output current (also called load current), $I_{Lmp}$ is an excitation current of the primary excitation inductor $L_m$ when a secondary side diode is off, and $I_{Lmpp}$ is an excitation current of the primary excitation inductor $L_m$ when a primary side driving signal is off.

By means of performing a simulation comparison at different frequencies and loads, an interpolation method may be used to derive the coefficients $k_{ipeak}$ and $k_{iLmp}$.

Specifically, firstly for a minimum load, normalized frequency points fs1 of 6 different operating frequencies fs are taken, 6 groups of $I_{Lmp}$ and $I_{Lmpp}$ are obtained by means of simulation, and $I_{Lmp}/I_{Lmpp}$ is calculated to obtain 6 values of $K_{iLmp}$, as shown by the curve of FIG. 8A; then for a maximum load, a $k_{iLmp}$ curve shown in FIG. 8B is likewise obtained by means of simulation. Hence, $k_{iLmp}$ at any load and any frequency is definitely a certain value located between these two curves, and said $k_{iLmp}$ may be calculated by means of linear interpolation.

Similarly, FIG. 8C, at a minimum load, takes normalized frequency points fs1 at 6 different operating frequencies fs, obtains 6 groups of $I_o$ and $I_{peak}$ by means of simulation, and calculates $$\frac{\pi}{2}$$

$I_o/I_{peak}$ to obtain 6 values of $k_{ipeak}$ and the curve as shown in FIG. 8C, and at a maximum load, the $k_{ipeak}$ curve shown in FIG. 8D is likewise obtained by means of simulation. Hence, $k_{ipeak}$ at any load and any frequency is definitely a certain value located between these two curves, and said $k_{ipeak}$ may be calculated by means of linear interpolation.

It can be understood that, during the simulation process, a suitable number of frequency points may be chosen according to requirements, and the number of frequency points is not limited to 6.

Figure 9:
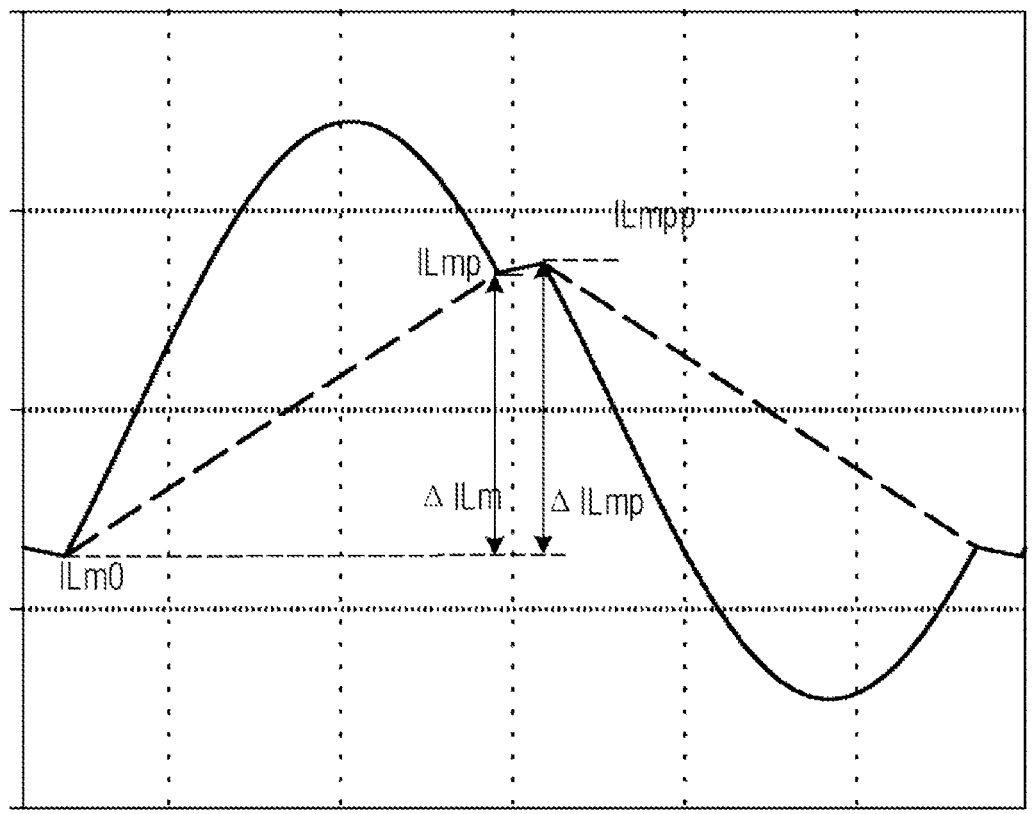
FIG. 9 shows an enlarged waveform graph of a resonant current and an excitation current.

FIG. 9 shows an enlarged waveform graph of a resonant current (solid line) and an excitation current (dotted line).

It can be understood, from a current waveform of an excitation inductor $L_m$ shown by the dotted line in FIG. 9, that during the operating process of the excitation inductor $L_m$, the current must be a waveform having positive-negative symmetry, with a total average value of 0, otherwise the inductor does not operate in a stable state. Therefore, $I_{Lmpp}=-I_{Lm0}$ may be approximately obtained, that is, $I_{Lmpp}$ and $I_{Lm0}$ have the same absolute value.

By means of the above analysis, a diode on-time $T_{cndc}$ may be expressed as:

$$T_{cndc} = \frac{1}{2f_r} \cdot \sqrt{\frac{1}{1 + \frac{N}{\pi} \cdot \frac{I_{Lm0}}{I_o} \cdot k_{ipeak}(1 - k_{iLmp})}}$$

It must be explained that the excitation current of the transformer is unmeasurable, only the resonant current can be measured. $I_{Lm0}$ in the formula is an initial value of the excitation current at the start of each cycle, and initial values of the excitation current and resonant current at the start of each cycle are the same as each other; with reference to FIG. 9, the resonant current (solid line) and excitation current (dotted line) both change from the same initial value, which is a characteristic of an LLC circuit. Therefore, a measured resonant current initial value of a primary resonant inductor may act as an $I_{Lm0}$ value.

An average output current $I_o$ and resonant current are sampled at a falling edge of a primary side driving signal; hence a diode on-time can be approximately calculated.

Figure 10:
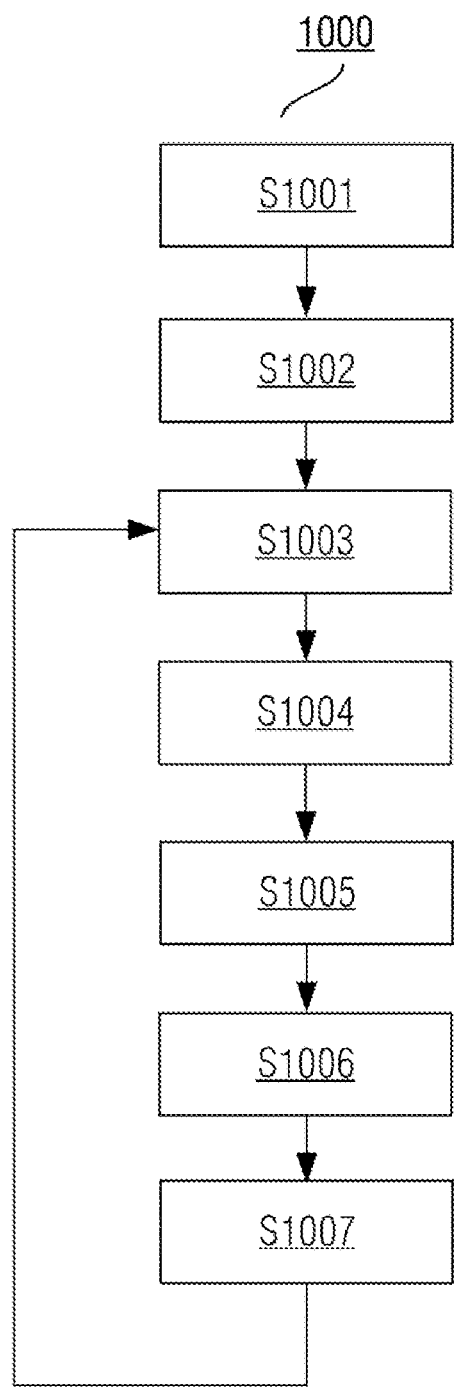
FIG. 10 is a flowchart of an illustrative process of an example method for determining a synchronous rectification on-time of a CLLC converter in an under-resonant operation mode.

Below, in conjunction with FIG. 10, a specific description is given of a method for determining a synchronous rectification on-time of a CLLC converter in an under-resonant operation mode, according to an embodiment of the present disclosure. FIG. 10 is a flowchart of an exemplary process of a method 1000 for determining a synchronous rectification on-time of a CLLC converter in an under-resonant operation mode.

Firstly, in step S1001, a transformer turns ratio N and resonant frequency fr of a converter are determined.

Next, in step S1002, a simulation method is used, which may obtain datasets ($I_{peak}$, $I_o$) and ($I_{Lmp}$, $I_{Lmpp}$) of a peak current $I_{peak}$ and output current $I_o$ of a secondary side diode, as well as an excitation current $L_{mp}$ of an excitation inductor Lm when a secondary side diode is off, and an excitation current $I_{Lmpp}$ of the excitation inductor Lm when a primary side driving signal is off.

For the specific simulation process, reference may be made to the method described above in conjunction with FIGS. 8A-8D, which is not again recounted here.

Next, in step S1003, a current operating frequency $f_s$ and current output current $I_o$ of the converter are measured.

Next, in step S1004, according to the current operating frequency $f_s$ and current output current $I_o$, a first coefficient $k_{ipeak}$ and a second coefficient $k_{iLmp}$ are determined by means of a linear interpolation method.

The first coefficient $k_{ipeak}$ is defined as a ratio of the output current to the peak current then multiplied by $$\frac{\pi}{2},$$

that is $$k_{i_{peak}} = \frac{\pi}{2} I_o / I_{peak}.$$

The second coefficient $k_{iLmp}$ is defined as a ratio of an excitation current $I_{Lmp}$ of the excitation inductor $L_m$ when a secondary side diode is off to an excitation current $I_{Lmpp}$ of the excitation inductor Lm when a primary side driving signal is off, that is $k_{iLmp} = I_{Lmp}/I_{Lmpp}$.

By means of a linear interpolation method, a current first coefficient and second coefficient may be determined in the datasets ($I_{peak}$, $I_o$) and ($I_{Lmp}$, $I_{Lmpp}$) determined in step S1002.

Next, in step S1005, a resonant current initial value of a primary resonant inductor is measured, and as described above, an initial value $I_{Lm0}$ Of an excitation current equals said resonant current initial value.

Next, in step S1006, according to the transformer turns ratio N, the resonant frequency $f_r$, the resonant current initial value $I_{Lm0}$, the output current $I_o$, the first coefficient $k_{ipeak}$ and the second coefficient $k_{iLmp}$, a diode on-time is calculated.

After the on-time of the diode is determined, in step S1007, said on-time may be used to configure a timing register in a controller of the converter, so that synchronous conduction of a MOSFET and the diode may be controlled.

Preferably, steps S1003, S1004, S1005, S1006 and S1007 are re-executed in each switching cycle of the CLLC converter, to determine a diode on-time of each switching cycle.

By such a means, a diode on-time of each switching cycle may be obtained, ensuring a MOSFET may conduct synchronously with a diode in every switching cycle.

A specific example is explained below with reference to FIG. 11, to verify the accuracy of determining a diode on-time according to the method of the present invention.

Parameters of a bidirectional CLLC circuit are: $L_{r1}$=15 μH, $L_m$=75 μH, $C_{r1}$=42 nF, $L_{r2}$=3.75 uH, $C_{r2}$=169 nF, N=2, resonant frequency fr=200 kHz, and $V_{in}$=800 V. Using the method of the present invention, simulation and calculation results curves of diode on-times at different operating frequencies may be obtained.

Figure 11A:
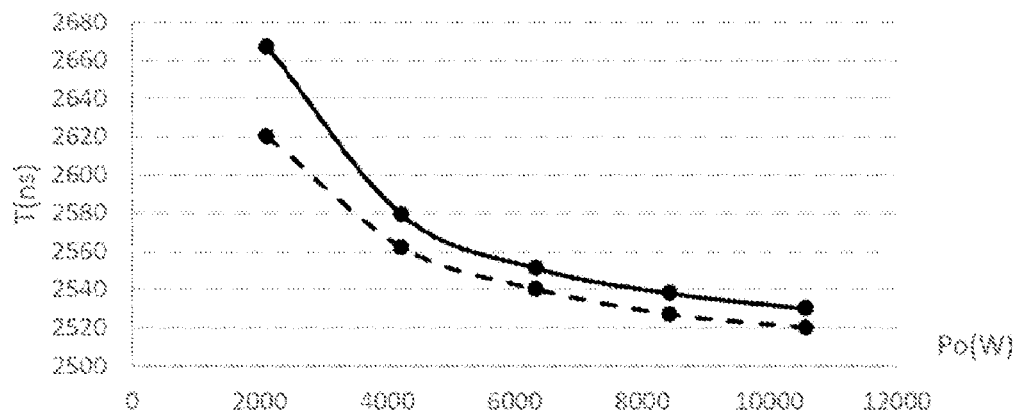
FIGS. 11A and 11B respectively show a simulation curve and calculation results curve of a diode on-time at different operating frequencies.
Figure 11B:
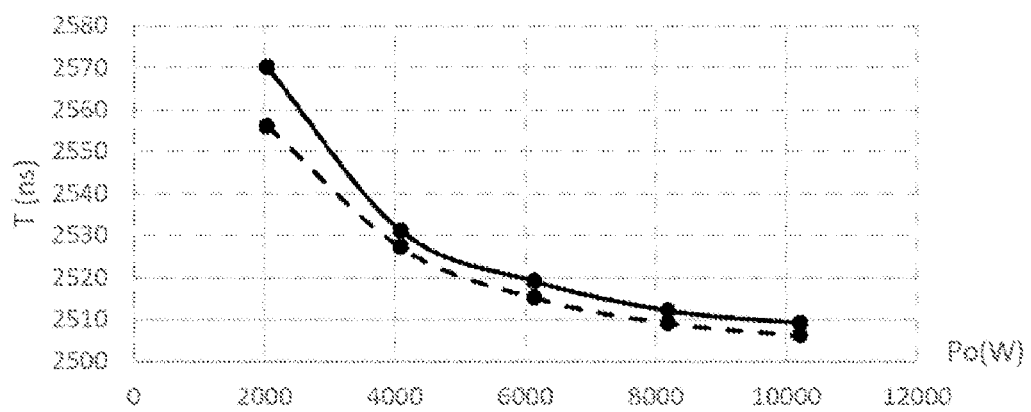

FIG. 11A is a curve at an operating frequency fs=180 kHz, and FIG. 11B is a curve at an operating frequency fs=190 kHz. In FIGS. 11A and 11B, the horizontal axis represents output power Po, in units of watts (W), and the vertical axis represents time T, in units of nanoseconds (ns), the solid lines represent an actual on-time of a diode, and the dotted lines represent a simulated on-time of a diode. It can be seen from FIGS. 11A and 11B that as output power Po increases, a calculation error decreases; and the more operating frequency approaches resonant frequency, the higher the accuracy.

According to an embodiment of the present invention, for a CLLC operation in an under-resonant mode, a method for determining a synchronous rectification on-time is provided. The method, by means of measuring a resonant current and output current value, may approximately calculate a synchronous rectification on-time.

Compared with a conventional current sensor solution, the method of the present invention does not require a high-bandwidth current and zero-crossing detection circuit, in this way saving on hardware costs and PCB space.

Compared with a conventional lookup table solution, this type of method does not need to measure diode on-time at different frequencies and loads in advance, and therefore saves on a large amount of work.

The above describes specific embodiments of the present description. Other embodiments are within the scope of the attached claims. In some situations, actions or steps recited in the claims may be executed according to a different order from that in the embodiments and still may achieve the desired results. In addition, the processes depicted in the drawings do not necessarily require the specific order shown or a sequential order to achieve the desired results. In certain embodiments, multi-task processing and parallel processing are also possible or may be advantageous.

Not all the steps and units in the flows and system structure diagrams above are necessary; certain steps or units may be omitted according to actual requirements. Apparatus structures described in the embodiments above may be physical structures, or may also be logical structures, that is, some units may be realized by the same physical entity, or some units may be respectively realized by multiple physical entities or may be jointly realized by certain components in multiple independent devices.

The particular embodiments set forth above with reference to the drawings describe exemplary embodiments, and do not represent all embodiments that can be implemented or that fall within the scope of protection of the claims. The term "exemplary" as used throughout the description means "serving as an example, instance or illustration" and does not mean "preferred" or "advantageous" over other embodiments. The particular embodiments comprise specific details for the purpose of providing an understanding of the described techniques. However, these techniques may be implemented without these specific details. In some instances, in order to avoid obscuring the concepts of the described embodiments, well-known structures and apparatuses are shown in a block diagram form.

The above description of the present disclosed content is provided to enable any person of ordinary skill in the art to implement or use the present disclosed content. Various modifications to the present disclosed content will be apparent to a person of ordinary skill in the art, and the general principles defined herein may be applied to other modifications without departing from the scope of protection of the present disclosed content. Therefore, the present disclosed content is not limited to the examples and designs described herein, but is consistent with the broadest scope conforming to the principles and novel features disclosed herein.

The embodiments above are merely example embodiments of the teachings of the present disclosure, and are not intended to limit the scope thereof. Any amendments, equivalent substitutions or improvements etc. made within the spirit and principles of the teachings shall be included in the scope of protection thereof.

What is claimed is:

1. A method for determining a synchronous rectification on-time of a CLLC (capacitor-inductor-inductor-capacitor) converter operating in an under-resonant mode, the method comprising:
   determining a transformer turns ratio and resonant frequency of the CLLC converter;
   using a simulation method, determining datasets of a peak current and output current of a secondary side diode, as well as an excitation current of a primary excitation inductor when the secondary side diode is off, and an excitation current of the primary excitation inductor when a primary side driving signal is off;
   measuring a current operating frequency and current output current of the CLLC converter;
   based on the operating frequency and the output current, calculating a first coefficient and a second coefficient by means of a linear interpolation method, wherein the first coefficient is equal to a ratio of the output current to the peak current then multiplied by $$\frac{\pi}{2},$$

and the second coefficient is equal to a ratio of the excitation current of the primary excitation inductor when the secondary side diode is off to an excitation current of the primary excitation inductor when the primary side driving signal is off;
   measuring a resonant current initial value of a primary resonant inductor; and
   based on the transformer turns ratio, the resonant frequency, the resonant current initial value, the current output current, the first coefficient and the second coefficient, calculating a diode on-time.

2. The method as claimed in claim 1, further comprising using the calculated diode on-time to configure a timing register in a controller of the converter.

3. The method as claimed in claim 1, wherein the method includes determining a diode on-time of each switching cycle of the CLLC converter.

4. The method as claimed in claim 1, wherein the value of the diode on-time is calculated using:

$$\frac{1}{2*\text{resonant frequency}} \cdot \sqrt{1 + \frac{\text{turns ratio}}{\pi} \cdot \frac{\text{resonant current initial value}}{\text{output current}} \cdot \frac{1}{\text{first coefficient}(1 - \text{second coefficient})}}$$

* * * * *